(12) United States Patent
Kumaki et al.

(10) Patent No.: US 9,914,791 B2
(45) Date of Patent: Mar. 13, 2018

(54) DISPERSING AGENT FOR SUSPENSION POLYMERIZATION OF VINYL COMPOUND

(71) Applicant: KURARAY CO., LTD., Kurashiki-shi (JP)

(72) Inventors: Yosuke Kumaki, Kurashiki (JP); Takeshi Kusudou, Kurashiki (JP); Shunsuke Fujioka, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/116,748

(22) PCT Filed: Feb. 4, 2015

(86) PCT No.: PCT/JP2015/053083
§ 371 (c)(1),
(2) Date: Aug. 4, 2016

(87) PCT Pub. No.: WO2015/119144
PCT Pub. Date: Aug. 13, 2015

(65) Prior Publication Data
US 2016/0347883 A1    Dec. 1, 2016

(30) Foreign Application Priority Data
Feb. 5, 2014  (JP) ................................. 2014-020679

(51) Int. Cl.
| | | |
|---|---|---|
| C08F 114/06 | (2006.01) |
| C08F 2/20 | (2006.01) |
| C08F 8/12 | (2006.01) |
| C08F 118/08 | (2006.01) |
| C08F 216/06 | (2006.01) |
| C08F 116/06 | (2006.01) |
| B01F 17/00 | (2006.01) |
| C08F 14/06 | (2006.01) |
| C08F 8/00 | (2006.01) |
| C08F 220/44 | (2006.01) |
| C08F 220/56 | (2006.01) |

(52) U.S. Cl.
CPC ........ *C08F 114/06* (2013.01); *B01F 17/0028* (2013.01); *C08F 2/20* (2013.01); *C08F 8/00* (2013.01); *C08F 8/12* (2013.01); *C08F 14/06* (2013.01); *C08F 116/06* (2013.01); *C08F 118/08* (2013.01); *C08F 216/06* (2013.01); *C08F 220/44* (2013.01); *C08F 220/56* (2013.01); *C08F 2810/30* (2013.01)

(58) Field of Classification Search
CPC .................................................. C08F 114/06
USPC ....................................................... 526/202
See application file for complete search history.

(56) References Cited

U.S. PATENT DOCUMENTS

| | | | |
|---|---|---|---|
| 4,226,966 A | | 10/1980 | Shiraishi et al. |
| 5,780,547 A | † | 7/1998 | Saeki |
| 5,977,273 A | | 11/1999 | Saeki et al. |
| 2010/0190890 A1 | | 7/2010 | Michel et al. |
| 2010/0324198 A1 | | 12/2010 | Nii et al. |
| 2015/0191558 A1 | | 7/2015 | Fukuhara et al. |

FOREIGN PATENT DOCUMENTS

| | | | |
|---|---|---|---|
| EP | 1 433 794 A1 | | 6/2004 |
| EP | 1 443 060 A1 | | 8/2004 |
| JP | S49-9488 A | † | 1/1974 |
| JP | S61-111307 A | † | 5/1986 |
| JP | 5-105702 A | | 4/1993 |
| JP | 5-88251 B2 | | 12/1993 |
| JP | 8-208724 A | | 8/1996 |
| JP | H08-208724 A | † | 8/1996 |
| JP | 8-269112 A | | 10/1996 |
| JP | 2001-192416 A | † | 7/2001 |
| JP | 2002-30104 A | | 1/2002 |
| JP | 2007-63369 A | | 3/2007 |
| JP | 4223545 B2 | | 2/2009 |
| JP | 2009-062425 A | † | 3/2009 |
| JP | 2010-533761 A | | 10/2010 |
| WO | WO 2008/096727 A1 | | 8/2008 |
| WO | WO 2014/014009 A1 | | 1/2014 |

OTHER PUBLICATIONS

International Search Report dated Mar. 3, 2015, in PCT/JP2015/053083 filed Feb. 4, 2015.
Kobunishi Kanko Kai, "Poval", pp. 369 to 373 and pp. 411 to 415, (1984), 8 pages.
Extended European Search Report dated Aug. 28, 2017 issued in corresponding European patent application 15746650.9.
Manufacture of Plastics, vol. 1, edited by W. Mayo Smith, Reinhold Publishing Corporation, 1964, pp. 266 and 281.†
Polyvinyl Alcohol Properties and Applications, edited by C. A. Finch, John Wiley & Sons, 1973, pp. 131-132.†
NFPA® 69, Standard on Explosion Prevention Systems, 2014 Edition, pp. 69-1 and 69-12.†
Explosion Prevention Practical Manual, Science Forum Co., Ltd., Tokyo, Japan, Dec. 26, 1984, Table 10, p. 418, and English Translation.†

† cited by third party

*Primary Examiner* — Terressa Boykin
(74) *Attorney, Agent, or Firm* — Oblon, McClelland, Maier & Neustadt, L.L.P.

(57) ABSTRACT

There is provided a dispersing agent for suspension polymerization of a vinyl compound comprising a polyvinyl alcohol with a saponification degree of 65 to 90 mol % which satisfies Formulas (1) to (3). It allows for reducing the amount of coarse particles during polymerization and can thus provide a vinyl polymer with a sharp particle size distribution and higher plasticizer absorbability.

$$0.4 \leq (Mw_{UV}/Mw_{RI}) \leq 0.95 \qquad (1)$$

$$3 \leq (Mw_{UV}/Mn_{UV}) \leq 12 \qquad (2)$$

$$0.1 \leq A_{220} \leq 0.8 \qquad (3)$$

13 Claims, No Drawings

DISPERSING AGENT FOR SUSPENSION POLYMERIZATION OF VINYL COMPOUND

TECHNICAL FIELD

The present invention relates to a dispersing agent for suspension polymerization of a vinyl compound consisting of a polyvinyl alcohol, and a process for producing a vinyl polymer therewith.

BACKGROUND ART

Polyvinyl alcohol (hereinafter, sometimes abbreviated as "PVA") is known to be a water-soluble synthetic polymer. A PVA exhibits particularly improved strength properties and film-forming properties in comparison with other synthetic polymers. A PVA is thus employed as a raw material for forming a film and a fiber; an additive for paper processing and fiber processing; an adhesive; a stabilizer for emulsion polymerization and suspension polymerization; a binder for an inorganic material; and the like. As described above, PVAs are valued in various applications.

A PVA is generally used as a dispersing agent for suspension polymerization of a vinyl chloride. In suspension polymerization, a vinyl compound dispersed in an aqueous medium is polymerized in the presence of an oil-soluble catalyst to give a particulate vinyl polymer. Here, in order to improve quality of a polymer obtained, a dispersing agent is added to an aqueous medium. Factors which dominantly influence quality of a vinyl polymer produced by suspension polymerization of a vinyl compound include a polymerization rate, a ratio of water to a vinyl compound (monomer), a polymerization temperature, a type and an amount of an oil-soluble catalyst, a model of a polymerization vessel, a stirring rate of the content in the polymerization vessel and the type of a dispersing agent. Among others, the type of a dispersing agent significantly influences quality of a vinyl polymer.

For a dispersing agent used for suspension polymerization of a vinyl compound, it is required (1) that an amount of coarse particles formed during polymerization is small and a vinyl polymer having a sharp particle size distribution is obtained, and (2) that a vinyl polymer with a high particle porosity and a high plasticizer absorbability is obtained. Conventionally, a cellulose derivative such as methylcellulose and carboxymethylcellulose, and a partially saponified PVA are used as a dispersing agent, alone or in combination. Such a dispersing agent cannot, however, satisfy the above requirements (1) and (2).

Non-patent Reference No. 1 (Kobunshi Kanko Kai, "Poval", pp. 369 to 373 and pp. 411 to 415, 1984) has disclosed a PVA with a polymerization degree of 2000 and a saponification degree of 80 mol % and a PVA with a polymerization degree of 700 to 800 and a saponification degree of 70 mol %, as a dispersing agent used in suspension polymerization of vinyl chloride. Such a dispersing agent cannot, however, fully satisfy the above requirements (1) and (2).

Patent Reference No. 1 (JP 5-88251 B) has disclosed a dispersing agent consisting of a PVA wherein an average polymerization degree is 500 or more; a ratio of an weight-average polymerization degree Pw to a number-average polymerization degree Pn (Pw/Pn) is 3.0 or less; it has a structure comprising a carbonyl group and an adjacent vinylene group [—CO—(CH=CH—)$_2$]; a 0.1% aqueous solution thereof has an absorbance of 0.3 or more and 0.15 or more at a wavelength of 280 nm and 320 nm, respectively; and a ratio of an absorbance (b) at a wavelength of 320 nm to an absorbance (a) at a wavelength of 280 nm [(b)/(a)] is 0.30 or more.

Patent Reference No. 2 (JP 5-105702 A) has disclosed a dispersing agent consisting of a PVA with a saponification degree of 75 to 85 mol %, an absorbance of 0.1 or more of a 0.1 wt % aqueous solution at a wavelength of 280 nm, a carboxyl-group content of 0.01 to 0.15 mol %, and a clouding point of 50° C. or higher of a 0.1 wt % aqueous solution.

Patent Reference No. 3 (JP 8-208724 A) has disclosed a dispersing agent for suspension polymerization consisting of a PVA having the above structure [—CO—(CH=CH—)$_2$] in its molecule, an absorbance of 2.5 or more of a 1 wt % aqueous solution at a wavelength of 280 nm, an average polymerization degree of 500 or more, a saponification degree of 60 to 90 mol %, a ratio of a weight-average molecular weight Mw to a number-average molecular weight Mn (Mw/Mn) of 2.5 or less, a block character for a saponification degree of 0.45 or less, and a methanol-soluble content of 10 wt % or less.

Patent Reference No. 4 (JP 2007-063369 A) has disclosed a dispersing agent for suspension polymerization consisting of a PVA produced by copolymerizing a maleic acid derivative with a vinyl ester monomer followed by saponification to give a carboxyl-group containing PVA, then washing and drying the product, and then randomly introducing an ethylenic double bond starting from the carboxyl group into a main chain.

Patent Reference No. 5 (WO 2008/96727 A1) has disclosed a dispersing agent for suspension polymerization consisting of a PVA having an enone structure in a main chain in its molecule which is produced by copolymerizing carbon monooxide with a vinyl ester monomer followed by saponifying, washing and drying.

However, dispersing agents disclosed in Patent Reference Nos. 1 to 5 cannot always fully satisfy the requirements (1) and (2). Furthermore, a highly UV-absorbing PVA tends to be discolored, so that it may adversely affect hue of a molded vinyl polymer.

PRIOR ART REFERENCES

Patent References

Patent Reference No. 1: JP 5-88251 B
Patent Reference No. 2: JP 5-105702 A
Patent Reference No. 3: JP 8-208724 A
Patent Reference No. 4: JP 2007-063369 A
Patent Reference No. 5: WO 2008/96727 A1

Non-Patent References

Non-patent Reference No. 1: Kobunshi Kanko Kai, "Poval", pp. 369 to 373 and pp. 411 to 415, 1984.

SUMMARY OF THE INVENTION

Problems to be Solved by the Invention

To solve the above problems, an objective of the present invention is to provide a dispersing agent for suspension polymerization which provides a vinyl polymer with a smaller amount of coarse particles formed during polymerization than a conventional process, a sharp particle size distribution and a high plasticizer absorbability.

Means for Solving the Problems

The above problems are solved by providing a dispersing agent for suspension polymerization of a vinyl compound consisting of a polyvinyl alcohol (hereinafter, sometimes abbreviated as "PVA") with a saponification degree of 65 to 90 mol %, which satisfies Formulas (1) to (3):

$$0.4 \leq (Mw_{UV}/Mw_{RI}) \leq 0.95 \quad (1)$$

$$3 \leq (Mw_{UV}/Mn_{UV}) \leq 12 \quad (2)$$

$$0.1 \leq A_{220} \leq 0.8 \quad (3)$$

wherein, $Mw_{UV}$ is a weight-average molecular weight of the PVA as measured with an absorptiometer (measurement wavelength: 220 nm) in gel permeation chromatography (hereinafter, sometimes abbreviated as "GPC");

$Mw_{RI}$ is a weight-average molecular weight of the PVA as measured with a differential refractive index detector in GPC;

$Mn_{UV}$ is a number-average molecular weight of the PVA as measured with an absorptiometer (measurement wavelength: 220 nm) in GPC; and $A_{220}$ is an absorbance of a 0.1% by mass aqueous solution of the PVA (optical path length: 10 mm, measurement wavelength: 220 nm).

The above problems are also solved by providing a process for producing the dispersing agent for suspension polymerization as described above, comprising polymerizing a vinyl ester in the presence of an aldehyde or a halogenated compound having two or more halogen atoms in its molecule to give a polyvinyl ester, which is then saponified to give the PVA.

A preferred embodiment of the present invention is a process for producing a vinyl polymer, comprising suspension-polymerizing a vinyl compound in the presence of the dispersing agent in an aqueous medium. Here, a mass ratio of the aqueous medium to the vinyl compound (aqueous medium/vinyl compound) is preferably 0.9 to 1.2.

Effects of the Invention

By using a dispersing agent of the present invention, there can be provided a vinyl polymer with a smaller amount of coarse particles formed during polymerization than a conventional process, a sharp particle size distribution and a high plasticizer absorbability.

MODES FOR CARRYING OUT THE INVENTION

A dispersing agent for suspension polymerization of a vinyl compound according to the present invention consists of a PVA with a saponification degree of 65 to 90 mol %, which satisfies Formulas (1) to (3):

$$0.4 \leq (Mw_{UV}/Mw_{RI}) \leq 0.95 \quad (1)$$

$$3 \leq (Mw_{UV}/Mn_{UV}) \leq 12 \quad (2)$$

$$0.1 \leq A_{220} \leq 0.8 \quad (3)$$

wherein, $Mw_{UV}$ is a weight-average molecular weight of the PVA as measured with an absorptiometer (measurement wavelength: 220 nm) in GPC;

$Mw_{RI}$ is a weight-average molecular weight of the PVA as measured with a differential refractive index detector in GPC;

$Mn_{UV}$ is a number-average molecular weight of the PVA as measured with an absorptiometer (measurement wavelength: 220 nm) in GPC; and $A_{220}$ is an absorbance of a 0.1% by mass aqueous solution of the PVA (optical path length: 10 mm, measurement wavelength: 220 nm).

Herein, in the GPC measurement, hexafluoroisopropanol (hereinafter, hexafluoroisopropanol is sometimes abbreviated as "HFIP") is used as a mobile phase. $Mw_{UV}$, $Mw_{RI}$ and $Mn_{UV}$ are molecular weights on the basis of polymethyl methacrylate (hereinafter, sometimes abbreviated as "PMMA"). Here, UV light absorbance at a wavelength of 220 nm in the PVA is derived from the structure of $[-CO-(CH=CH-)_1]$.

In the GPC measurement of the present invention, a GPC apparatus is used, which has a differential refractive index detector and an absorptiometer and allows for cocurrent measurement by these detectors. The absorptiometer must be able to measure an absorbance at a wavelength of 220 nm. A PVA supplied for measurement is separated into molecular-weight components by a GPC column. A concentration of each molecular-weight component is measured by a differential refractive index detector, while an absorbance of each molecular-weight component (measurement wavelength: 220 nm) is measured by an absorptiometer. In GPC measurement of the present invention, measurement is conducted for several monodisperse PMMAs having different molecular weights as references, and a calibration curve is formed from GPC elution volumes and molecular weights of reference PMMAs. Using the calibration curve obtained, a molecular weight of the PVA in terms of PMMA is determined. In the present invention, for measurement using a differential refractive index detector, a calibration curve formed using the detector is used, while for measurement using an absorptiometer, a calibration curve formed using the detector is used. Thus, a concentration of each molecular-weight component is measured by a differential refractive index detector, while an absorbance of each molecular-weight component (measurement wavelength: 220 nm) is measured by an absorptiometer.

An absorptiometer can be either a detector which measures absorption of UV light at a particular wavelength or a detector which spectrometrically measures absorption of UV light at a particular range of wavelength.

In the above GPC measurement, HFIP is used as a solvent used for dissolving a sample and a mobile phase. HFIP can dissolve PVA and PMMA. Furthermore, for preventing a sample from being adsorbed by a GPC column filler, a salt such as sodium trifluoroacetate can be added to HFIP. There are no particular restrictions to a concentration of the salt as long as the above PVA can be normally separated, and it is generally 1 to 100 mmol/L, preferably 5 to 50 mmol/L.

A sample (PVA) concentration in the GPC measurement is generally 1.00 mg/mL and an injection volume is 100 μL.

A weight-average molecular weight $Mw_{UV}$ and a number-average molecular weight $Mn_{UV}$ of the PVA can be determined from a chromatogram obtained by plotting measured values by an absorptiometer (measurement wavelength: 220 nm) to a molecular weight of the PVA determined from a GPC elution volume. A weight-average molecular weight $Mw_{RI}$ of the PVA is determined from a chromatogram obtained by plotting measured values by a differential refractive index detector to a molecular weight of the PVA determined from a GPC elution volume. In the present invention, $Mw_{UV}$, $Mw_{RI}$ and $Mn_{UV}$ are values in terms of PMMA.

The PVA must satisfy formula (1).

$$0.4 \leq (Mw_{UV}/Mw_{RI}) \leq 0.95 \tag{1}$$

As shown in formula (1), $Mw_{RI}$ larger than $Mw_{UV}$ would be particularly due to absorption of UV light at a wavelength of 220 nm by a low-molecular-weight component. $Mw_{RI}$ corresponds to a weight-average molecular weight of the whole PVA, while $Mw_{UV}$ corresponds to a weight-average molecular weight having a structure capable of absorbing UV light at a wavelength of 220 nm (double bond in a molecular chain). Thus, 0.95 or less of ($Mw_{UV}/Mw_{RI}$) means that a double bond is selectively introduced into a low-molecular-weight component in the PVA. Generally, when suspension polymerization is conducted using a PVA as a dispersing agent, a low-molecular-weight component in the PVA is unstable, so that the amount of coarse particles formed may be increased. In contrast, introduction of a double bond into a molecular chain of a low-molecular-weight component in the PVA leads to improvement in stability. Therefore, when ($Mw_{UV}/Mw_{RI}$) is 0.95 or less, polymerization is highly stable. A PVA satisfying formula (1) can be prepared by employing a drying method described later as a drying method after saponification.

Meanwhile, when ($Mw_{UV}/Mw_{RI}$) is less than 0.4, double bonds are excessively introduced, so that coarse particles may be formed during polymerization and a hue of a vinyl polymer obtained may be adversely affected. If the PVA does not satisfy formula (1), polymerization using a dispersing agent obtained may result in a large amount of coarse particles, and a vinyl polymer obtained may have a broad particle size distribution, leading to deterioration in quality. The PVA preferably satisfies formula (1'), more preferably satisfies formula (1''), particularly preferably satisfies formula (1''').

$$0.43 \leq (Mw_{UV}/Mw_{RI}) \leq 0.90 \tag{1'}$$

$$0.46 \leq (Mw_{UV}/Mw_{RI}) \leq 0.85 \tag{1''}$$

$$0.50 \leq (Mw_{UV}/Mw_{RI}) \leq 0.80 \tag{1'''}$$

The PVA must satisfy formula (2).

$$3 \leq (Mw_{UV}/Mn_{UV}) \leq 12 \tag{2}$$

When ($Mw_{UV}/Mn_{UV}$) is less than 3, suspension polymerization using a dispersing agent obtained may lead to increase in the amount of coarse particles formed. Meanwhile, more than 12 of ($Mw_{UV}/Mn_{UV}$) may result in a large amount of coarse particles, leading to a broadened particle size distribution of a vinyl polymer formed and thus deterioration in quality. The PVA preferably satisfies formula (2'), more preferably satisfies formula (2''), particularly preferably satisfies formula (2''').

$$3.2 \leq (Mw_{UV}/Mn_{UV}) \leq 11.0 \tag{2'}$$

$$3.4 \leq (Mw_{UV}/Mn_{UV}) \leq 10.0 \tag{2''}$$

$$3.5 \leq (Mw_{UV}/Mn_{UV}) \leq 9.0 \tag{2'''}$$

For measurement of the absorbance $A_{220}$, a cell with an optical path length of 10 mm is used. A measurement wavelength is 220 nm. The PVA is dissolved in distilled water to prepare a 0.1% by mass aqueous solution, which is supplied to measurement.

The PVA must satisfy formula (3).

$$0.1 \leq A_{220} \leq 0.8 \tag{3}$$

When an absorbance $A_{220}$ of a 0.1% by mass aqueous solution of the PVA is less than 0.1, suspension polymerization using a dispersing agent obtained may result in increase in the amount of coarse particles formed. Meanwhile, if it is more than 0.80, vinyl polymer particles obtained may have a low porosity, plasticizer absorbability may be insufficient and/or a hue of a vinyl polymer obtained may be adversely affected.

A saponification degree of the PVA is 65 to 90 mol %, more preferably 68% to 85%, particularly preferably 68 to 80 mol %. If a saponification degree is less than 65 mol %, a PVA may become insoluble in water. Meanwhile, if a saponification degree is more than 90 mol %, suspension polymerization using a dispersing agent obtained may result in a large amount of coarse particles formed. Furthermore, vinyl polymer particles obtained may have a low porosity and plasticizer absorbability may be insufficient.

The saponification degree is measured by a method for measuring a saponification degree in accordance with JIS-K6726. Here, units other than vinyl alcohol units and vinyl acetate units are, if any, negligible.

A viscosity-average polymerization degree of the PVA is preferably 200 to 3000, more preferably 400 to 2000, particularly preferably 500 to 1000. If a viscosity-average polymerization degree is less than 200, industrial production may become difficult. Furthermore, suspension polymerization of a vinyl compound using a dispersing agent obtained may lead to deterioration in polymerization stability. Meanwhile, if a viscosity-average polymerization degree is more than 3000, polymerization using a dispersing agent obtained may result in vinyl polymer particles with low porosity, leading to insufficient plasticizer absorbability.

The above viscosity-average polymerization degree is measured in accordance with JIS-K6726. Specifically, a PVA is re-saponified and purified, and a limiting viscosity [η] (unit: L/g) of the product in water at 30° C. is measured and used for calculating the polymerization degree from the following equation.

$$\text{Polymerization degree} = ([\eta] \times 10000/8.29)^{(1/0.62)}$$

There are no particular restrictions to a process for producing the PVA, but it is preferably produced by polymerizing a vinyl ester followed by saponification. Examples of such a vinyl ester include vinyl acetate, vinyl formate, vinyl propionate, vinyl caprylate and vinyl versatate; among others, vinyl acetate is preferable.

In the light of easy adjustment of molecular distribution of the above PVA, it is preferable to polymerize a vinyl ester in the presence of an aldehyde or a halogenated compound having two or more halogen atoms in its molecule to give a polyvinyl ester, which is then saponified to give the PVA. The aldehyde or the halogenated compound would act as a chain transfer agent for producing a low-molecular-weight polyvinyl ester and to form a chemical structure capable of absorbing UV light at a wavelength of 220 nm in the course of subsequent saponification and drying. Therefore, the amounts of these can be changed to adjust molecular-weight distribution of the above PVA.

Examples of the above aldehyde used for polymerization of a vinyl ester include monoaldehydes such as formaldehyde, acetaldehyde, propionaldehyde, butylaldehyde and acrolein and dialdehydes such as glyoxal and glutaraldehyde; among others, acetaldehyde and propionaldehyde are suitably used.

In the above production process, the amount of the aldehyde added is preferably 1.0 to 8 mol %, more preferably 1.2 to 7 mol %, particularly preferably 1.5 to 6 mol % based on the total molar number of the vinyl ester and the aldehyde. If the amount of the aldehyde is less than 1.0 mol %, $Mw_{UV}/Mw_{RI}$ in formula (1) may be more than 0.95, $Mw_{UV}/Mn_{UV}$ in formula (2) may be less than 3, and/or $A_{220}$ in formula (3) may be less than 0.1. If it is more than 8 mol %, $Mw_{UV}/Mw_{RI}$ in formula (1) may be less than 0.4 and/or $A_{220}$ in formula (3) may be more than 0.8.

Examples of a halogenated compound having two or more halogen atoms in its molecule used in polymerization of a vinyl ester include halomethanes such as dichloromethane, trichloromethane, tetrachloromethane, dibromomethane, tribromomethane, tetrabromomethane, diiodomethane, triiodomethane, tetraiodomethane and bromochloromethane; haloethanes such as dichloroethane, trichloroethane, tetrachloroethane, pentachloroethane, hexachloroethane, dibromoethane, tribromoethane, tetrabromoethane, pentabromoethane and hexabromoethane; among others, trichloromethane, tetrachloromethane, tribromomethane and tetrabromomethane can be preferably used.

In the above production process, the amount of the halogenated compound added is preferably 0.05 to 0.7 mol %, more preferably 0.07 to 0.6 mol %, particularly preferably 0.1 to 0.5 mol % based on the total molar number of the vinyl ester and the halogenated compound. If the amount of the halogenated compound is less than 0.05 mol %, $Mw_{UV}/Mw_{RI}$ in formula (1) may be more than 0.95, $Mw_{UV}/Mn_{UV}$ in formula (2) may be less than 3, and/or $A_{220}$ in formula (3) may be less than 0.1. If it is more than 0.7 mol %, $Mw_{UV}/Mw_{RI}$ in formula (1) may be less than 0.4 and/or $A_{220}$ in formula (3) may be more than 0.8.

Polymerization of a vinyl ester can be conducted by any polymerization method such as bulk polymerization, solution polymerization, suspension polymerization and emulsion polymerization. The polymerization can be conducted neat or in the presence of an alcoholic solvent. Among these, bulk polymerization in neat system or solution polymerization using an alcoholic solvent can be suitably employed. Examples of the alcoholic solvent include, but not limited to, methanol, ethanol and propanol, which can be used alone or in combination of two or more.

There are no particular restrictions to a polymerization style, which can be any of batch polymerization, semi-batch polymerization, continuous polymerization and semi-continuous polymerization. In the light of obtaining a PVA having a particular range of molecular weight distribution, batch polymerization is preferable. In continuous polymerization, it is preferable that polymerization is conducted in two or more reactors which are continuously connected.

A conversion of the vinyl ester in the polymerization is, but not limited to, preferably 50% or more, more preferably 55% or more, particularly preferably 60% or more in the light of easy production of a PVA having the above molecular weight distribution. If a conversion is less than 50%, $Mw_{UV}/Mn_{UV}$ in formula (2) may be less than 3.

There are no particular restrictions to a temperature during polymerization (polymerization temperature) of a vinyl ester. A polymerization temperature is preferably 0 to 200° C., more preferably 30 to 140° C. If the temperature is lower than 0° C., a polymerization rate may be insufficient. If the temperature is higher than 200° C., a vinyl ester used may be decomposed.

There are no particular restrictions to a method for controlling a polymerization temperature of a vinyl ester. For example, the temperature is controlled by controlling a polymerization rate to make a balance between heat generation due to polymerization and heat release from a surface of a polymerization reactor, or by using an external jacket with a proper heat medium. In the light of safety, the latter method is preferable.

An initiator used for polymerizing a vinyl ester can be selected from known initiators (for example, azo initiators, peroxide initiators and redox initiators), depending on a polymerization method. Examples of an azo initiator include 2,2'-azobisisobutyronitrile, 2,2'-azobis(2,4-dimethylvaleronitrile) and 2,2'-azobis(4-methoxy-2,4-dimethylvaleronitrile). Examples of a peroxide initiator include percarbonates such as diisopropyl peroxydicarbonate, di-2-ethylhexyl peroxydicarbonate and diethoxyethyl peroxydicarbonate; perester compounds such as t-butyl peroxyneodecanate, α-cumyl peroxyneodecanate and t-butyl peroxydecanate; acetylcyclohexylsulfonyl peroxide; and 2,4,4-trimethylpentyl-2-peroxyphenoxy acetate. Furthermore, the above initiator can be combined with, for example, potassium persulfate, ammonium persulfate or hydrogen peroxide, to be an initiator. Furthermore, a redox initiator can be a combination of the above peroxide with a reducing agent such as sodium bisulfite, sodium bicarbonate, tartaric acid, L-ascorbic acid and Rongalite. If polymerization is conducted at high temperature, a vinyl ester may be decomposed. In that case, to a polymerization system, an antioxidizing agent such as tartaric acid can be added in about 1 to 100 ppm based on a vinyl ester, for the purpose of preventing decomposition.

In polymerization of a vinyl ester, additional monomer(s) can be copolymerized, without departing the scope of the present invention. Examples of such additional monomers include α-olefins such as ethylene and propylene; (meth) acrylic acid and its salts; (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate and octadecyl (meth)acrylate; (meth)acrylamide; (meth)acrylamide derivatives such as N-methyl(meth)acrylamide, N-ethyl (meth)acrylamide, N,N-dimethyl(meth)acrylamide, diacetone(meth)acrylamide, (meth)acrylamidopropanesulfonic acid and its salts, (meth)acrylamidopropyldimethylamine and its salts or quaternary salts, N-methylol(meth)acrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; halogenated vinyl compounds such as vinyl chloride and vinyl fluoride; halogenated vinylidenes such as vinylidene chloride and vinylidene fluoride; allyl compounds such as allyl acetate and allyl chloride; unsaturated dicarboxylic acids such as maleic acid, itaconic acid and fumaric acid and their salts or esters; vinylsilyl compounds such as vinyltrimethoxysilane; and isopropenyl acetate. The amount of such copolymerized additional monomer(s) involved in is generally 5 mol % or less.

The polyvinyl ester obtained can be saponified by any known saponification method without limitation; for example, alcoholysis or hydrolysis using a basic catalyst such as sodium hydroxide, potassium hydroxide and sodium methoxide or an acidic catalyst such as p-toluenesulfonic acid. Examples of a solvent which can be used in the reaction include alcohols such as methanol and ethanol; esters such as methyl acetate and ethyl acetate; ketones such as acetone and methyl ethyl ketones: and aromatic hydrocarbons such as benzene and toluene. These solvents can be used alone or in combination of two or more. It is particularly convenient and preferable that saponification is conducted using methanol or a mixture of methanol/methyl acetate as a solvent and a basic catalyst such as sodium hydroxide.

The amount of a basic catalyst is preferably 0.002 to 0.2, particularly preferably 0.004 to 0.1 as a molar ratio based on vinyl ester units in the polyvinyl ester obtained. The saponification catalyst can be added in one portion at the initiation of the saponification reaction. Alternatively, a part of the catalyst may be added at the initiation of the saponification reaction followed by adding the remaining catalyst in the course of the saponification reaction.

The saponification reaction is conducted preferably at a temperature of 5 to 80° C., more preferably 20 to 70° C. A time required for the saponification reaction is preferably 5 min to 10 hours, more preferably 10 min to 5 hours. The saponification reaction can be conducted by either batch or continuous style. At the end of the saponification reaction, the remaining saponification catalyst can be, if necessary, neutralized, and examples of a neutralizing agent which can be used include organic acids such as acetic acid and lactic acid and ester compounds such as methyl acetate.

An alkaline substance derived from an alkali metal added during the saponification reaction is generally neutralized with an ester such as methyl acetate generated as proceeding the saponification reaction or an organic acid such as acetic acid added after saponification, to give an alkali metal salt of an organic acid such as sodium acetate. A content of an alkali metal salt of an organic acid in a PVA of the present invention is, but not limited to, generally 2.5% by mass or less. To obtain such a PVA, a PVA prepared can be washed with a washing liquid. Examples of a washing liquid include methanol, acetone, methyl acetate, ethyl acetate, hexane and water. These can be used alone or as a mixture. Among these, methanol, methyl acetate and water are preferable.

The remaining washing liquid is removed from the PVA thus prepared, which is then dried. Any known method can be used for washing liquid removal and drying without limitation, and in the light of easy adjustment of molecular-weight distribution, drying is conducted preferably 2 to 6 hours while an oxygen concentration in a drying oven is less than 10% and a powder temperature is controlled to 90 to 120° C. If a powder temperature is lower than 90° C., $Mw_{UV}/Mn_{UV}$ in formula (2) may be less than 3 and/or $A_{220}$ in formula (3) may be less than 0.1. If it is higher than 120° C., $Mw_{UV}/Mw_{RI}$ in formula (1) may be more than 0.95, $Mw_{UV}/Mn_{UV}$ in formula (2) may be more than 12, and/or $A_{220}$ in formula (3) may be more than 0.8. If a drying time is less than 2 hours, $Mw_{UV}/Mn_{UV}$ in formula (2) may be less than 3, and/or $A_{220}$ in formula (3) may be less than 0.1. If it is more than 6 hours, $Mw_{UV}/Mw_{RI}$ in formula (1) may be more than 0.95, $Mw_{UV}/Mn_{UV}$ in formula (2) may be more than 12, and/or $A_{220}$ in formula (3) may be more than 0.8.

The PVA thus prepared is useful as a dispersing agent for suspension polymerization of a vinyl compound. To a dispersing agent of the present invention can contain, if necessary, additives generally used for suspension polymerization, such as a preservative, a mildew-proofing agent, a blocking inhibitor and a defoamer. A content of such additives is generally 1.0% by mass or less.

A suitable embodiment of the present invention is a process for producing a vinyl polymer comprising suspension-polymerizing a vinyl compound in the presence of a dispersing agent of the present invention. Examples of a vinyl compound which can be used as a starting monomer include halogenated vinyls such as vinyl chloride; vinyl ester monomers such as vinyl acetate and vinyl propionate; (meth)acrylic acids and their esters and salts; maleic acid, fumaric acid, and their esters and anhydrides; styrene; acrylonitrile; vinylidene chloride; and vinyl ether. Particularly preferably, suspension polymerization is conducted using vinyl chloride alone or in combination with a monomer copolymerizable with vinyl chloride. Examples of a monomer copolymerizable with vinyl chloride include vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile; styrene; vinylidene chloride; and vinyl ether.

A medium used for the above suspension polymerization is preferably an aqueous medium. Such an aqueous medium can be water or a medium containing water and an organic solvent. A water content of the aqueous medium is preferably 90% by mass or more.

The amount of the dispersing agent in the suspension polymerization is, but not limited to, generally 1 part by mass or less, preferably 0.01 to 0.5 parts by mass based on 100 parts by mass of a vinyl compound.

A mass ratio of an aqueous medium (A) to a vinyl compound (B) (A/B) in suspension polymerization of a vinyl compound is generally 0.9 to 2.0. In the light of further improvement in productivity, A/B is preferably 0.9 to 1.2. Conventionally, there has been a problem that the increase in a proportion of a vinyl compound leads to unstable polymerization. In contrast, the use of a dispersing agent of the present invention allows for stable polymerization even with a high proportion of a vinyl compound, with the amount of coarse particles being small. Furthermore, it provides a vinyl polymer with higher porosity and higher plasticizer absorbability.

For suspension polymerization of a vinyl compound, an oil-soluble or water-soluble polymerization initiator conventionally used for polymerization of a vinyl chloride monomer or the like, can be used. Examples of an oil-soluble polymerization initiator include percarbonate compounds such as diisopropyl peroxydicarbonate, di-2-ethylhexyl peroxydicarbonate and diethoxyethyl peroxydicarbonate; perester compounds such as t-butyl peroxyneodecanate, t-butyl peroxypivalate, t-hexyl peroxypivalate and α-cumyl peroxyneodecanate; peroxides such as acetyl cyclohexylsulfonyl peroxide, 2,4,4-trimethylpentyl-2-peroxyphenoxy acetate, 3,5,5-trimethylhexanoyl peroxide and lauroyl peroxide; and azo compounds such as azobis-2,4-dimethylvaleronitrile and azobis(4-2,4-dimethylvaleronitrile). Examples of a water-soluble polymerization initiator include potassium persulfate, ammonium persulfate, hydrogen peroxide and cumene hydroperoxide. These oil-soluble or water-soluble polymerization initiators can be used alone or in combination of two or more.

In suspension polymerization of a vinyl compound, various other additives can be, if necessary, used. Examples of such additives include a polymerization regulator such as aldehydes, halogenated hydrocarbons and mercaptans; and a polymerization inhibitor such as phenol compounds, sulfur-containing compounds and N-oxide compounds. Furthermore, a pH regulator and/or a cross-linker can be added as appropriate.

There are no particular restrictions to a polymerization temperature during suspension polymerization of vinyl compounds, and it can be, of course, as low as about 20° C., or can be controlled to an elevated temperature higher than 90° C. Furthermore, it is also a preferable embodiment that a polymerization reactor equipped with a reflux condenser is used for improving a heat removal efficiency of the polymerization reaction system.

In the above suspension polymerization, a dispersing agent of the present invention can be used alone or in combination with, for example, a water-soluble cellulose ether such as methylcellulose, hydroxyethylcellulose, hydroxypropylcellulose and hydroxypropylmethylcellulose; a water-soluble polymer such as polyvinyl alcohol and gelatin; an oil-soluble emulsifier such as sorbitan monolaurate, sorbitan trioleate, glycerin tristearate and ethylene oxide-propylene oxide block copolymer; and/or a water-soluble emulsifier such as polyoxyethylene sorbitan monolaurate, polyoxyethylene glycerin oleate and sodium laurate.

In the suspension polymerization, a dispersing agent of the present invention can be used in combination with a water-soluble or water-dispersible dispersing aid. Such a dispersing aid can be a partially saponified PVA with a saponification degree of less than 65 mol % and a polymerization degree of 50 to 750, preferably a partially saponified PVA with a saponification degree of 30 to 60 mol % and a polymerization degree of 180 to 650. The dispersing aid can be that which is made self-emulsiable by introducing an ionic group such as a carboxylic acid and sulfonic acid. When a dispersing aid is combined, a mass ratio of the dispersing agent to the dispersing aid (dispersing agent/dispersing aid) is, but not limited to, preferably 20/80 to 95/5, more preferably 30/70 to 90/10. The dispersing agent and the dispersing aid can be charged in one portion at the initiation of the polymerization, or portionwise charged in the course of the polymerization.

EXAMPLES

There will be further specifically described the present invention with reference to Examples. In Examples and Comparative Examples below, "part(s)" and "%" denote, unless otherwise stated, part(s) by mass and % by mass, respectively.

Example 1

Production of PVA

In a reaction vessel were charged 2850 g of vinyl acetate, 150 g of methanol and 75 g of acetaldehyde, the atmosphere of the reaction vessel was replaced with nitrogen via bubbling nitrogen gas. Separately, 5.7 g of 2,2'-azobisisobutyronitrile was dissolved in methanol to prepare an initiator solution and the atmosphere was replaced with nitrogen via bubbling nitrogen gas. Warming of the reaction vessel was initiated and at the time when the internal temperature reached 60° C., the above initiator solution was added to the reaction vessel to initiate polymerization. During the polymerization, a polymerization temperature was kept at 60° C. Seven hours after the initiation of polymerization, the vessel was cooled to terminate the polymerization. A polymerization conversion at this time was 90%. Then, at 30° C. and under a reduced pressure, unreacted vinyl acetate was removed while methanol was sometimes added, to provide a solution of polyvinyl acetate in methanol (concentration: 50%).

From the solution of polyvinyl acetate in methanol was removed an aliquot, to which was added a 10% solution of sodium hydroxide in methanol in such an amount that an alkali molar ratio (molar ratio of an alkali compound to a vinyl acetate unit in a polyvinyl acetate) was to be 0.5. The mixture was left at 60° C. for 5 hours to make saponification progress. At the end of saponification, the mixture was soxhlet-extracted with methanol for 3 days and dried under a reduced pressure at 80° C. for 3 days, to give a purified PVA. A polymerization degree of the PVA was 600 as determined in accordance with JIS K6726.

To the above 50% solution of polyvinyl acetate in methanol was added water, methanol, methyl acetate and 10% solution of sodium hydroxide in methanol in such amounts that concentrations of polyvinyl acetate, water and methyl acetate were to be 30%, 1% and 30%, respectively and an alkali molar ratio was to be 0.010, to initiate saponification of polyvinyl acetate. About 3 min after alkali addition, the gelled mixture was pulverized by a pulverizer and left at 40° C. for 1 hour to allow saponification to proceed, followed by centrifugal deliquoring. This PVA was dried for 4 hours in a hot-air dryer in which an oxygen concentration was controlled to less than 10% by blowing nitrogen (preset temperature: 100° C.). A saponification degree of the PVA thus obtained was 70 mol % as determined in accordance with JIS K6726.

[GPC Measurement]
(Measuring Apparatus)

GPC measurement was conducted using "GPCmax" from VISCOTECH Co., Ltd. A differential refractive index detector used was "TDA305" from VISCOTECH Co., Ltd. A UV-visible absorptiometer used was "UV Detector 2600" from VISCOTECH Co., Ltd. A GPC column used was "GPC HFIP-806M" from SHOWA DENKO K. K. An analysis software used was OmniSEC (Version 4.7.0.406) which was an attached software to the apparatus.

(Measurement Conditions)

A PVA was dissolved in HFIP containing sodium trifluoroacetate in 20 mmol/L, to prepare a 1.00 mg/mL solution. The solution was filtered through a 0.45 μm polytetrafluoroethylene filter and supplied for measurement. A mobile phase was HFIP containing sodium trifluoroacetate as used for dissolving the PVA, and a flow rate was 1.0 mL/min. A sample injection volume was 100 μL, and measurement was conducted at a GPC column temperature of 40° C.

(Creation of a Calibration Curve)

Measurement was conducted for a PMMA from Agilent Technologies as a standard (peaktop molecular weight: 1944000, 790000, 467400, 271400, 144000, 79250, 35300, 13300, 7100, 1960, 1020, 690), and a calibration curve was created for each of the differential refractive index detector and the UV-visible absorptiometer using the analysis software. The calibration curve obtained was used to convert an eluted amount into a molecular weight of the PMMA.

Under such apparatus conditions, the PVA thus obtained was measured. A measured value as determined by an absorptiometer (measurement wavelength: 220 nm) was plotted to a molecular weight of the PVA as converted from a GPC eluted volume to create a chromatogram, from which a weight-average molecular weight $Mw_{UV}$ and a number-average molecular weight $Mn_{UV}$ were determined. A measured value as determined by a differential refractive index detector to a molecular weight of the PVA as converted from a GPC eluted volume was plotted to create a chromatogram, from which a weight-average molecular weight $Mw_{RI}$ was determined. From these values, ($Mw_{UV}/Mw_{RI}$) and ($Mw_{UV}/Mn_{UV}$) were determined to be 0.55 and 8.6, respectively.

[Absorbance Measurement]

An absorbance was measured using an absorptiometer "UV2100" from Shimadzu Corporation. The PVA obtained was dissolved in water to prepare a 0.1% by mass aqueous solution. The aqueous solution was placed in a cell (optical path length: 10 mm) and an absorbance at a wavelength of 220 nm was determined to be 0.30.

[Suspension Polymerization of Vinyl Chloride]

The PVA obtained above was dissolved in deionized water in such an amount that the PVA was equivalent to 1000 ppm based on vinyl chloride, to prepare an aqueous solution of a dispersion stabilizer (1150 g). The aqueous solution of a dispersion stabilizer was charged in a 5 liter autoclave. Subsequently, to the autoclave was charged 1.5 g of a 70% solution of diisopropyl peroxydicarbonate in toluene. The autoclave was degassed until an internal pressure became 0.0067 MPa for removing oxygen. Then, 1000 g of vinyl chloride was charged and the content of the autoclave was warmed to 57° C. to initiate polymerization with stirring. A mass ratio of water used for the polymerization (A) to vinyl chloride (B) [A/B] was about 1.1. At the beginning of the polymerization, an internal pressure of the autoclave was 0.83 MPa. After seven hours passed from the initiation of the polymerization, an internal pressure of the autoclave become 0.44 MPa, and at that time, the polymerization was terminated and the unreacted vinyl chloride was removed. Then, the polymerization slurry was removed and dried at 65° C. overnight, to provide vinyl chloride polymer particles.

(Evaluation of a Vinyl Chloride Polymer)

For a vinyl chloride polymer, an average particle size, the amount of coarse particles, a plasticizer absorbability, and colorability of a sheet obtained by molding the vinyl chloride polymer were measured by the following methods. The evaluation results are shown in Table 2.

(1) Average Particle Size

Using Tyler-mesh screens, particle size distribution was determined by dry screen analysis, to determine an average particle size of vinyl chloride polymer particles.

(2) Amount of Coarse Particles

For the vinyl chloride polymer particles obtained, a content of JIS standard screen 42 mesh-on (% by mass) was measured. A decrease in the content as measured indicates that the amount of coarse particles decreases and the polymerization stability increases.

(3) Plasticizer Absorbability (CPA)

The amount of dioctyl phthalate absorbed by the vinyl chloride polymer particles at 23° C. was measured in accordance with a method described in ASTM-D3367-75.

(4) Colorability

In a magnetic beaker were charged 100 g of the vinyl chloride polymer particles obtained, 3 g of dibutyltin bis (maleic acid monoaralkyl ester) salt and 0.01 g of pigment blue 29, which was blended to prepare a vinyl chloride resin composition. The polyvinyl chloride resin composition obtained was kneaded at 170° C. for 5 min by a test roll, to form a sheet with a thickness of 0.4 mm. The sheet was cut into a plurality of 45×30 mm sheet pieces. Twelve to fourteen sheet pieces obtained were layered and pressed at 195° C. for 5 min to prepare a test piece with a thickness of 5 mm, for which yellow index (YI) was determined using a color meter ("SM-T-H" from Suga Test Instruments Co., Ltd.).

Examples 2 to 9

A PVA was produced as described in Example 1, except that the amounts of vinyl acetate and methanol, the type and the amount of a chain transfer agent, and the conditions of washing and drying after saponification were changed as shown in Table 1. Here, when the PVA was washed after saponification, the PVA chip before drying was immersed in a washing liquid of methyl acetate/methanol=7/3 (mass ratio) at room temperature for 30 min. The washing liquid was used in a mass 5 times as much as polyvinyl acetate used for saponification. The PVA obtained was evaluated as described in Example 1. Then, suspension polymerization of vinyl chloride was conducted as described in Example 1, except that the PVA obtained was used as a dispersing agent, and the vinyl chloride polymer particles obtained was evaluated. The results are shown in Tables 1 and 2.

As shown in Tables 1 and 2, when suspension polymerization of vinyl chloride was conducted using a dispersion stabilizer of the present invention satisfying the above conditions, polymerization was highly stable with a smaller amount of coarse particles formed and polymer particles with a small average particle size was obtained. Furthermore, the vinyl chloride polymer particles obtained exhibited excellent plasticizer absorbability. Furthermore, evaluation of colorability of a sheet produced from vinyl chloride polymer particles demonstrated that coloration was inhibited.

Comparative Examples 1 and 2

A PVA was produced as described in Example 1, except that the amounts of vinyl acetate and methanol, and the polymerization conditions were changed, a chain transfer agent was absent, and the washing conditions after saponification were changed, as shown in Table 1. The PVA obtained was evaluated as described for Example 1. Then, as described in Example 1, suspension polymerization of vinyl chloride was conducted except that the PVA obtained was used as a dispersing agent and the vinyl chloride polymer particles obtained were evaluated. The results are shown in Tables 1 and 2. Suspension polymerization of the vinyl chloride monomer was very unstable and particles were aggregated in the course of polymerization, resulting in block formation.

Comparative Examples 3 and 4

A PVA was produced as described in Example 1, except that the conditions of washing after saponification and the drying conditions were changed as shown in Table 1. The PVA obtained was evaluated as described for Example 1. Then, as described in Example 1, suspension polymerization of vinyl chloride was conducted except that the PVA obtained was used as a dispersing agent and the vinyl chloride polymer particles obtained were evaluated. The results are shown in Tables 1 and 2. Increase of double bonds formed would be due to changing the conditions after saponification reaction and the stricter drying conditions. For the vinyl chloride polymer particles obtained, plasticizer absorbability was low and hue was deteriorated.

Comparative Examples 5 and 6

A PVA was produced as described in Example 1, except that the amounts of vinyl acetate and methanol, the amount of a chain transfer agent, the polymerization conditions, and the washing conditions after saponification were changed as shown in Table 1. The PVA obtained was evaluated as described for Example 1. Then, as described in Example 1, suspension polymerization of vinyl chloride was conducted except that the PVA obtained was used as a dispersing agent and the vinyl chloride polymer particles obtained were evaluated. The results are shown in Tables 1 and 2. Comparative Examples 5 and 6 deal with decrease and increase a chain transfer agent (acetaldehyde) used in PVA synthesis. In both cases, the amount of coarse particles in the vinyl chloride polymer obtained was increased. When the amount of a chain transfer agent was larger (Comparative Example 6), hue in a sheet produced using a vinyl chloride polymer was deteriorated.

Comparative Example 7

A PVA was produced as described in Example 8, except that the conditions of drying a PVA obtained were changed as shown in Table 1. The PVA obtained was evaluated as described for Example 1. Then, as described in Example 1, suspension polymerization of vinyl chloride was conducted except that the PVA obtained was used as a dispersing agent and the vinyl chloride polymer particles obtained were evaluated. The results are shown in Tables 1 and 2. Increase of double bonds formed would be due to the stricter drying conditions after saponification. For the vinyl chloride polymer particles obtained, plasticizer absorbability was low and hue was deteriorated.

Comparative Examples 8 and 9

A PVA was produced as described in Example 8, except that the amounts of vinyl acetate and methanol, the amount of a chain transfer agent and the polymerization conditions were changed as shown in Table 1. The PVA obtained was evaluated as described for Example 1. Then, as described in Example 1, suspension polymerization of vinyl chloride was conducted except that the PVA obtained was used as a dispersing agent and the vinyl chloride polymer particles obtained were evaluated. The results are shown in Tables 1 and 2. Comparative Examples 8 and 9 deal with decrease and increase a chain transfer agent (tetrachloromethane) used in PVA synthesis. When the amount of a chain transfer agent is smaller (Comparative Example 8), the amount of coarse particles in the vinyl chloride polymer obtained was increased. When the amount of a chain transfer agent was larger (Comparative Example 9), hue in a sheet produced using a vinyl chloride polymer was deteriorated.

Comparative Example 10

Production of PVA

In a reaction vessel were charged 1800 g of vinyl acetate, 1200 g of methanol and 5 g of maleic anhydride, the atmosphere of the reaction vessel was replaced with nitrogen via bubbling nitrogen gas. Separately, 2.0 g of 2,2'-azobisisobutyronitrile was dissolved in methanol to prepare an initiator solution and the atmosphere was replaced with nitrogen via bubbling nitrogen gas. Warming of the reaction vessel was initiated and at the time when the internal temperature reached 60° C., the above initiator solution was added to the reaction vessel to initiate polymerization. During the polymerization, a polymerization temperature was kept at 60° C. Over 4 hours from polymerization initiation, a 20% solution of maleic anhydride in methanol was added. At the time when a polymerization conversion reached 60%, the vessel was cooled to terminate the polymerization. Then, at 30° C. and under a reduced pressure, the unreacted vinyl acetate monomer was removed while methanol was sometimes added, to provide a solution of polyvinyl acetate in methanol (concentration: 50%). Using the solution of polyvinyl acetate in methanol, a polymerization degree was measured as described in Example 1. A PVA was produced and evaluated as described in Example 1, except that the polyvinyl acetate obtained was used and washing and drying were conducted under the conditions as shown in Table 1. Then, as described in Example 1, suspension polymerization of vinyl chloride was conducted except that the PVA obtained was used and the vinyl chloride polymer particles obtained were evaluated. The results are shown in Tables 1 and 2.

Comparative Example 11

A PVA was produced as described in Comparative Example 10, except that the amounts of vinyl acetate, methanol and maleic anhydride, the amount of maleic acid added later and a period of the addition were changed as shown in Table 1. The PVA obtained was evaluated as described for Example 1. Then, as described in Example 1, suspension polymerization of vinyl chloride was conducted except that the PVA (dispersing agent) obtained was used and the vinyl chloride polymer particles obtained were evaluated. The results are shown in Tables 1 and 2.

Comparative Examples 10 and 11 shows the evaluation results of a PVA, in which an enone structure has been introduced in its molecular chain, produced by copolymerization of vinyl acetate and maleic anhydride as described in Patent Reference No. 4. In both cases, the amount of coarse particles in the vinyl chloride polymer obtained was increased. Furthermore, hue of a sheet produced using the vinyl chloride polymer was deteriorated.

Comparative Example 12

Polymerization of vinyl acetate, saponification, washing of a PVA obtained, and centrifugal deliquoring were conducted as described in Comparative Example 3. This PVA was dried for 4 hours in the air in a hot-air dryer (preset temperature: 150° C.) without nitrogen blowing and without controlling an oxygen concentration. The PVA obtained was evaluated as described in Example 1. Then, suspension polymerization of vinyl chloride was conducted as described in Example 1, except that the PVA obtained was used as a dispersing agent, and the vinyl chloride polymer particles obtained were evaluated. The results are shown in Tables 1 and 2. Formation of double bonds would be further increased due to conducting drying of the PVA in the air without adjusting an oxygen concentration. For the vinyl chloride polymer particles obtained, plasticizer absorbability was low and hue was significantly deteriorated.

As indicated in the above examples, when a dispersing agent of the present invention was used, suspension polymerization of vinyl chloride was very stable. And, vinyl chloride polymer particles with small amount of coarse particles and high plasticizer absorbability were obtained. Furthermore, coloration was inhibited in a molded article produced using the vinyl chloride polymer obtained. As described above, a dispersing agent of the present invention is very useful.

TABLE 1

| | Polymerization conditions | | | | | | |
|---|---|---|---|---|---|---|---|
| | Vinyl acetate (g) | Methanol (g) | Chain transfer agent | | | Polymerization conversion (%) | Washing[d] Yes/No |
| | | | Type | Amount (g) | Amount[a] (mol %) | | |
| Example 1 | 2850 | 150 | Acetaldehyde | 75 | 4.9 | 90 | No |
| Example 2 | 2850 | 150 | Acetaldehyde | 75 | 4.9 | 90 | No |
| Example 3 | 2850 | 150 | Acetaldehyde | 75 | 4.9 | 90 | No |
| Example 4 | 2250 | 750 | Acetaldehyde | 40 | 3.4 | 60 | Yes |
| Example 5 | 2250 | 750 | Acetaldehyde | 30 | 2.5 | 75 | No |
| Example 6 | 2400 | 600 | Propionaldehyde | 40 | 2.4 | 90 | Yes |
| Example 7 | 2100 | 900 | Propionaldehyde | 20 | 1.4 | 50 | Yes |
| Example 8 | 2850 | 150 | Tetrachloromethane | 15 | 0.3 | 90 | Yes |
| Example 9 | 2850 | 150 | Tetrabromomethane | 15 | 0.14 | 90 | Yes |
| Comparative Example 1 | 1800 | 1200 | None | 0 | 0 | 90 | Yes |
| Comparative Example 2 | 2100 | 900 | None | 0 | 0 | 90 | Yes |
| Comparative Example 3 | 2850 | 150 | Acetaldehyde | 75 | 4.9 | 90 | Yes |
| Comparative Example 4 | 2850 | 150 | Acetaldehyde | 75 | 4.9 | 90 | No |
| Comparative Example 5 | 2250 | 750 | Acetaldehyde | 10 | 0.9 | 90 | Yes |
| Comparative Example 6 | 2700 | 300 | Acetaldehyde | 150 | 9.8 | 40 | No |
| Comparative Example 7 | 2850 | 150 | Tetrachloromethane | 15 | 0.3 | 90 | Yes |
| Comparative Example 8 | 2100 | 900 | Tetrachloromethane | 1 | 0.03 | 90 | Yes |
| Comparative Example 9 | 2850 | 150 | Tetrachloromethane | 40 | 0.76 | 10 | Yes |
| Comparative Example 10 | 1800 | 1200 | Maleic anhydride (comonomer) | b) | b) | 60 | Yes |
| Comparative Example 11 | 1500 | 1500 | Maleic anhydride (comonomer) | c) | c) | 60 | Yes |
| Comparative Example 12 | 2850 | 150 | Acetaldehyde | 75 | 4.9 | 90 | Yes |

| | Drying conditions | | Polymerization degree | Saponification degree (%) | Sodium acetate content (%) | $Mw_{UV}/Mw_{RI}$ | $Mw_{UV}/Mn_{UV}$ | Absorbance of a 0.1% aqueous solution at 220 nm |
|---|---|---|---|---|---|---|---|---|
| | Temperature (°C.) | Time (hr) | | | | | | |
| Example 1 | 100 | 3 | 600 | 70 | 2.2 | 0.55 | 8.6 | 0.30 |
| Example 2 | 110 | 4 | 600 | 70 | 2.2 | 0.63 | 8.9 | 0.48 |
| Example 3 | 120 | 4 | 600 | 70 | 2.2 | 0.92 | 11.4 | 0.72 |
| Example 4 | 100 | 3 | 760 | 72 | 0.6 | 0.82 | 3.6 | 0.18 |
| Example 5 | 120 | 4 | 910 | 82 | 2.2 | 0.88 | 5.5 | 0.25 |
| Example 6 | 100 | 3 | 550 | 75 | 1.1 | 0.81 | 7.0 | 0.21 |
| Example 7 | 120 | 4 | 950 | 78 | 0.9 | 0.92 | 3.5 | 0.17 |
| Example 8 | 100 | 3 | 680 | 73 | 1.2 | 0.75 | 3.8 | 0.55 |
| Example 9 | 100 | 3 | 800 | 74 | 0.8 | 0.65 | 4.3 | 0.68 |
| Comparative Example 1 | 100 | 3 | 620 | 72 | 0.9 | 0.98 | 2.6 | 0.05 |
| Comparative Example 2 | 100 | 3 | 980 | 78 | 1.1 | 1.02 | 2.7 | 0.06 |
| Comparative Example 3 | 150 | 4 | 600 | 70 | 0.8 | 1.00 | 12.3 | 0.78 |
| Comparative Example 4 | 150 | 2 | 600 | 72 | 2.2 | 0.98 | 12.5 | 0.90 |
| Comparative Example 5 | 100 | 3 | 960 | 70 | 1.2 | 0.93 | 2.9 | 0.08 |
| Comparative Example 6 | 100 | 3 | 530 | 78 | 2.2 | 0.60 | 3.9 | 0.82 |
| Comparative Example 7 | 150 | 4 | 680 | 73 | 1.2 | 0.91 | 5.2 | 0.88 |
| Comparative Example 8 | 100 | 3 | 540 | 81 | 0.9 | 0.98 | 3.1 | 0.09 |
| Comparative Example 9 | 100 | 3 | 470 | 75 | 0.8 | 0.41 | 8.0 | 0.86 |
| Comparative Example 10 | 100 | 3 | 1100 | 79 | 2.2 | 1.03 | 5.2 | 0.64 |
| Comparative Example 11 | 100 | 3 | 720 | 71 | 1.9 | 1.01 | 5.4 | 0.67 |

TABLE 1-continued

| | | | | | | | |
|---|---|---|---|---|---|---|---|
| Comparative Example 12 | 150[e] | 4 | 600 | 70 | 0.8 | 0.85 | 13.1 | 0.95 |

[a] Proportion of a chain transfer agent based on the total molar number of vinyl acetate and the chain transfer agent
b) Initial charge is 5 g, and later, 187 mL of a 20% mass methanol solution is added over 4 hours.
c) Initial charge is 4.2 g, and later, 156 mL of a 20% mass methanol solution is added over 4.5 hours.
[d] Immersed in a washing liquid of methyl acetate/methanol = 7/3 (mass ratio) for 30 min. The mass of the washing liquid is 5 times as much as the mass of the polyvinyl acetate used in the saponification reaction.
[e] Dried in the air by a dry-air heater without nitrogen blowing.

TABLE 2

| | Vinyl chloride polymer particles | | | |
|---|---|---|---|---|
| | Average particle size (μm) | Amount of coarse particles (mass %) | Plasticizer absorbability (%) | Color-ability (YI) |
| Example 1 | 162 | 2.0 | 27.0 | 25.7 |
| Example 2 | 130 | 0.9 | 25.6 | 26.9 |
| Example 3 | 108 | 1.0 | 24.2 | 30.0 |
| Example 4 | 160 | 1.9 | 29.2 | 24.9 |
| Example 5 | 148 | 1.2 | 24.5 | 22.0 |
| Example 6 | 155 | 1.8 | 24.8 | 23.2 |
| Example 7 | 165 | 1.2 | 24.1 | 21.8 |
| Example 8 | 140 | 0.4 | 25.0 | 25.9 |
| Example 9 | 131 | 1.0 | 27.0 | 27.8 |
| Comparative Example 1 | Not measured due to block formation | | | |
| Comparative Example 2 | Not measured due to block formation | | | |
| Comparative Example 3 | 105 | 0.1 | 22.0 | 35.0 |
| Comparative Example 4 | 102 | 0.1 | 19.8 | 36.2 |
| Comparative Example 5 | 256 | 10.8 | 29.8 | 21.0 |
| Comparative Example 6 | 180 | 3.8 | 28.0 | 40.1 |
| Comparative Example 7 | 120 | 0 | 19.0 | 35.4 |
| Comparative Example 8 | 242 | 7.7 | 31.2 | 24.6 |
| Comparative Example 9 | 97 | 0 | 17.8 | 41.1 |
| Comparative Example 10 | 182 | 4.6 | 27.6 | 27.8 |
| Comparative Example 11 | 189 | 3.9 | 27.2 | 28.2 |
| Comparative Example 12 | 103 | 0.1 | 21.0 | 42.0 |

The invention claimed is:

1. A dispersing agent consisting of a polyvinyl alcohol with a saponification degree of 65 to 90 mol %, which satisfies Formulas (1) to (3):

$$0.4 \leq (Mw_{UV}/Mw_{RI}) \leq 0.95 \quad (1)$$

$$3 \leq (Mw_{UV}/Mn_{UV}) \leq 12 \quad (2)$$

$$0.1 \leq A_{220} \leq 0.8 \quad (3)$$

wherein $Mw_{UV}$ is a weight-average molecular weight of the polyvinyl alcohol as measured with an absorptiometer, at a measurement wavelength of 220 nm, in gel permeation chromatography;

$Mw_{RI}$ is a weight-average molecular weight of the polyvinyl alcohol as measured with a differential refractive index detector in gel permeation chromatography;

$Mn_{UV}$ is a number-average molecular weight of the polyvinyl alcohol as measured with an absorptiometer, at a measurement wavelength of 220 nm, in gel permeation chromatography; and $A_{220}$ is an absorbance of a 0.1% by mass aqueous solution of the polyvinyl alcohol, with an optical path length of 10 mm, and a measurement wavelength of 220 nm.

2. A process for producing the dispersing agent of claim 1, comprising polymerizing a vinyl ester in the presence of an aldehyde to give a polyvinyl ester and then saponifying the polyvinyl ester.

3. A process for producing the dispersing agent for of claim 1, comprising polymerizing a vinyl ester in the presence of a halogenated compound having two or more halogen atoms in its molecule to give a polyvinyl ester and then saponifying the polyvinyl ester.

4. A process for producing a vinyl polymer, comprising suspension-polymerizing a vinyl compound in the presence of the dispersing agent of claim 1, in an aqueous medium.

5. The process of claim 4, wherein a mass ratio of the aqueous medium to the vinyl compound is in a range of 0.9 to 1.2.

6. The dispersing agent of claim 1, wherein:
$0.43 \leq (Mw_{UV}/Mw_{RI}) \leq 0.90$.

7. The dispersing agent of claim 1, wherein:
$0.46 \leq (Mw_{UV}/Mw_{RI}) \leq 0.85$.

8. The dispersing agent of claim 1, wherein:
$0.50 \leq (Mw_{UV}/Mw_{RI}) \leq 0.80$.

9. The dispersing agent of claim 1, wherein:
$3.2 \leq (Mw_{UV}/Mn_{UV}) \leq 11.0$.

10. The dispersing agent of claim 1, wherein:
$3.4 \leq (Mw_{UV}/Mn_{UV}) \leq 10.0$.

11. The dispersing agent of claim 1, wherein:
$3.5 \leq (Mw_{UV}/Mn_{UV}) \leq 9.0$.

12. The dispersing agent of claim 1, wherein the saponification degree is 68 to 85 mol %.

13. The dispersing agent of claim 1, wherein the saponification degree is 68 to 80 mol %.

* * * * *